Sept. 1, 1931.  A. L. SEGELHORST  1,821,328
TOOL JOINT
Filed Oct. 29, 1927
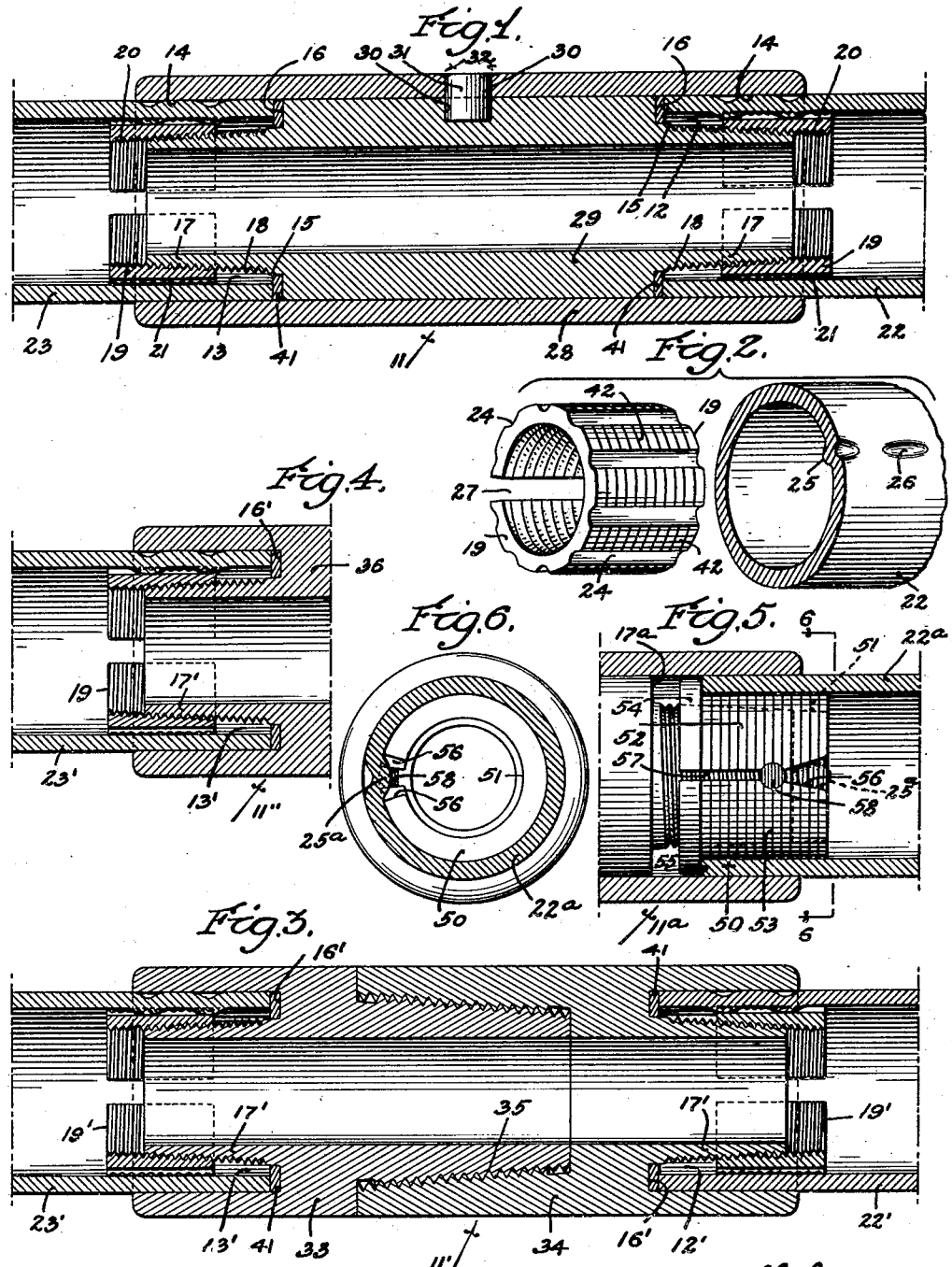
INVENTOR
By AUGUST L. SEGELHORST
ATTORNEY Patented Sept. 1, 1931

1,821,328

UNITED STATES PATENT OFFICE

AUGUST L. SEGELHORST, OF HUNTINGTON BEACH, CALIFORNIA

TOOL JOINT

Application filed October 29, 1927. Serial No. 229,606.

My invention relates to the type of tool joint commonly used in the oil well drilling practice for joining the sections of tubing or casing used in oil wells, this being more particularly a type of joint which depends upon frictional engagement for the retention of the respective joined members and having, as a fundamental object, the elimination of the threads and upset ends ordinarily necessary in the type of joint now commonly used.

Other objects and advantages of my invention will appear from the following description of the accompanying drawings chosen for illustrative purposes only, in which Fig. 1 is a sectional view of one embodiment of my invention.

Fig. 2 is a perspective view showing the relation between a portion of my invention and the oil well tubing.

Figs. 3 and 4 are sectional views of modified forms of my invention.

Fig. 5 is a partial sectional view of a modified form of my invention, and

Fig. 6 is a section along the line 6—6 of Fig. 5.

More particularly describing my invention as herein illustrated, 11 indicates a coupling collar, the ends of which are provided with annular recesses 12 and 13. These mentioned recesses extend parallel with the axis of the coupling collar, to a substantial distance therein. They are segmental wedge shaped in section, each having an outer edge 14 parallel with the axis of the collar, and an inner edge 15 which is tapered outwardly toward the axis from an internal shoulder 16. The tapered surface which defines the inner edge 15 is formed on what may be termed an extending shank 17 and is provided with an external thread 18, which is adapted to receive an expanding split collar 19, having a tapered and threaded internal surface 20 and a substantially cylindrical external surface 21. The mentioned end recesses 12 and 13 are further adapted to receive the ends of unthreaded tubing members 22 and 23 respectively, each of which internally engages the outer cylindrical surface of an expanding member 19 and externally engages the outer edge 14 of the recess.

It will be understood that when the tubing members are in the position shown in Fig. 1, the relative advance of the threaded shank 17 into the expanding member 19 will cause the last mentioned member to expand, having a resultant wedging action upon the tubing. It is therefore necessary to obtain best results, that there be no relative rotation between the tubing and the expanding member which is accomplished by providing the expanding member with means such as the grooves 24, shown in Fig. 2, and the tubing member with corresponding projections 25 and 26, which may be formed by any means, such as punch marks or spot welding. It will be understood that the mentioned grooves may optionally be omitted and the slot 27 formed in the split expanding collar 19 used for the same purpose.

In the form of my invention shown in Fig. 1, the coupling collar consists of an outer cylindrical sleeve member 28 and an inner tubular member 29. The outer ends of the inner member 29 are provided with the shoulders 16 and the outwardly extending threaded and tapered shanks 17. The outer sleeve members 28 and the inner tubular member 29 are further provided with a common aperture 30 which receives a plug 31, held in place by means such as the spot weld 32 for the purpose of preventing relative movement between the two mentioned members.

In the modified form of my invention illustrated in Fig. 3, I show the collar 11' as being composed of two end sections 33 and 34, provided with cooperating threads 35. The outer end of each section is milled to form the recesses 12' and 13' containing the shoulder 16' and the threaded shank 17', which recesses are adapted to receive tubing members 22' and 23' respectively, the latter members being held in place by the split collars 19'.

The modified form of my invention shown in Fig. 4 is the same in all respects as that illustrated in Fig. 3, except that the collar 11' is made in one complete unit 36.

In order to assure a tight union in the tool joints, as illustrated in Figs. 1 to 4, I may provide the shoulder or engaging seat 16 with a packing ring 41, which may be composed of lead or other similar substance and is adapted to externally engage the inner end of the tubing.

For the purpose of increasing the coefficient of friction between the expanding member and the tubing, I may provide the expanding member with a knurled outer surface 42, substantially as shown in Fig. 2.

The assembly of the type of coupling illustrated in Figs. 1 to 4, inclusive, is effected as follows: the expanding member 19 is placed in the tubing (22 or 23) with one of the linear grooves 24 in alignment with the projections 25 and 26. The tubing is then placed in the recess (12 or 13) with the inner end in firm engagement with the packing ring 41. The coupling is then rotated in the usual manner, drawing the expanding collar 19 toward the shoulder 16, and thereby effecting a powerful wedging force upon the tubing, holding same in place by frictional engagement between the contacting surfaces.

In order that I may obtain a greater advance of the expanding member into the coupling, and thereby gain a greater wedging action upon the tubing member, I may use an expanding member of the type shown in Figs. 5 and 6. This member comprises a split expanding collar 50, having a threaded outwardly tapered inner surface 51 and a substantially cylindrical outer surface 52, which may optionally be provided with knurling 53. The expanding collar 50 is further provided with an inner flange 54, which is of slightly less diameter than the tubing member 22a. The tubing 22a, which is adapted to engage the outer face 55 of the flange 54, is provided with a projection 25a which is received by a V opening 56 in the slot 57 of the expanding member 50 for the purpose of preventing relative rotation between the two members. The slot 57 is further provided with a packing disk 58, which may be composed of rubber or other suitable packing substance and serves to prevent the passage of fluid from the tubing, through the slot 57. It will be noted in this form of my invention that the tubing 22a is advanced relative to the coupling member 11a by means of the expanding member 50, and that the limit of relative advance between the two members is governed entirely by the wedging action of the expanding member, since there can be no binding between the end of the tube 22a and the shoulder or seat 17a. It will be understood that the expanding ring 50 may be used with any of the three above described types of coupling collars.

While I have herein shown and described certain embodiments of my invention, it will be understood that various features of the same may be readily adapted by those familiar with the art without in the least departing from the spirit and scope of my invention, as described above and in the accompanying claims.

I claim as my invention:

1. A tool joint comprising: tubing members having aligned projections therein; an expanding member adapted to externally engage said projections; and a coupling member having annular recesses formed in the external ends thereof adapted to receive said tubular member and said expanding member, said coupling member recesses and said expanding member being provided with cooperating threaded surfaces for effecting the advancement and expansion of said expanding member relatively thereto.

2. A tool joint comprising: tubing members having a projection therein; an expanding member adapted to externally engage said projection; and a coupling member comprising a plurality of cooperatively threaded sections, having annular recesses formed in the external ends thereof adapted to receive said tubular member and said expanding member, said coupling member recesses and said expanding member being provided with cooperating threaded surfaces for effecting the advancement and expansion of said expanding member relatively thereto.

3. A tool joint comprising: tubing members each having a projection therein; an expanding member having a knurled external surface and adapted to externally engage said projection; a coupling member having annular recesses formed in the external ends thereof adapted to receive said tubular member and said expanding member, said coupling member recesses and said expanding member being provided with cooperating threaded surfaces for effecting the advancement and expansion of said expanding member relatively thereto.

4. A tool joint comprising: tubing members; and a coupling member interposed between said tubing members, including split ring frictional members adapted to be expanded and cooperatively mounted between said tubing members and said coupling member for preventing longitudinal movement therebetween.

5. A tool joint comprising: tubing members; and a coupling member interposed between said tubing members including split ring frictional members adapted to be expanded, said frictional members being provided with knurled engaging surfaces.

6. A tool joint comprising: tubing members; a coupling member having tubing receiving recesses in the ends thereof; expanding members internally engageable through cooperating threads with said coupling recesses, and externally engageable with said tubing members; and means preventing the relative rotation between said expanding members and said tubing members.

7. A tool joint comprising: tubing members; a coupling member having tubing receiving recesses in the ends thereof; expanding members internally engageable through cooperating threads with said coupling recesses and externally engageable with said tubing members; and means preventing the relative rotation between said expanding members and said tubing members, comprising cooperating linear grooves and projections.

8. A tool joint comprising: tubing members; a sleeve interposed between the ends of said tubing members having annular taper threaded recesses to receive the ends of said tubing members; and split ring members in said recesses adapted to engage said threads and to wedge the ends of said tubing members into tight engagement with said sleeve.

In testimony whereof, I have hereunto set my hand at Los Angeles, California, this 18th day of October, 1927.

AUGUST L. SEGELHORST.